(12) United States Patent
Oberhuber

(10) Patent No.: US 7,710,190 B2
(45) Date of Patent: May 4, 2010

(54) APPARATUS AND METHOD FOR COMPENSATING CHANGE IN A TEMPERATURE ASSOCIATED WITH A HOST DEVICE

(75) Inventor: Ralph Oberhuber, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 46 days.

(21) Appl. No.: 11/502,822

(22) Filed: Aug. 10, 2006

(65) Prior Publication Data

US 2008/0036524 A1 Feb. 14, 2008

(51) Int. Cl.
*H03L 5/00* (2006.01)
*H01L 35/00* (2006.01)
(52) U.S. Cl. .................. 327/512; 327/513; 327/539
(58) Field of Classification Search ................ 327/307, 327/512, 513, 539; 323/313, 314, 315, 907
See application file for complete search history.

(56) References Cited

U.S. PATENT DOCUMENTS

| | | | |
|---|---|---|---|
| 4,544,878 A * | 10/1985 | Beale et al. ................. 323/315 |
| 6,392,470 B1 | 5/2002 | Burstein et al. | |
| 6,404,177 B2 | 6/2002 | Wang | |
| 6,407,622 B1 | 6/2002 | Opris | |
| 6,411,158 B1 | 6/2002 | Essig | |
| 6,426,669 B1 | 7/2002 | Friedman et al. | |
| 6,462,526 B1 | 10/2002 | Tanase | |
| 6,462,612 B1 | 10/2002 | Roh | |
| 6,489,835 B1 | 12/2002 | Yu et al. | |
| 6,501,256 B1 | 12/2002 | Jaussi et al. | |
| 6,501,299 B2 | 12/2002 | Kim et al. | |
| 6,507,178 B2 | 1/2003 | Cocetta | |
| 6,507,179 B1 | 1/2003 | Jun et al. | |
| 6,507,180 B2 | 1/2003 | Eguchi | |

(Continued)

OTHER PUBLICATIONS

"Precision Temperature Measurement Using CMOS Substrate PNP Transistors," IEEE Sensors Journal, vol. 4, No. 3, Jun. 2004 (Michiel A. P. Pertijs, Student Member, IEEE, Gerard C. M. Meijer, Senior Member, IEEE, and Johan H. Huijsing, Fellow, IEEE), pp. 294-300.

(Continued)

*Primary Examiner*—Lincoln Donovan
*Assistant Examiner*—Colleen O'Toole
(74) *Attorney, Agent, or Firm*—John J. Patti; Wade J. Brady, III; Frederick J. Telecky, Jr.

(57) ABSTRACT

An apparatus for compensating temperature changes in a temperature associated with a compensated device includes: (a) An input circuit having a first input locus for receiving a temperature-indicating signal and a second input locus for receiving a sign-indicating signal. The temperature-indicating signal indicates magnitude of the temperature. The sign-indicating signal indicates a first sign when a control signal is greater than a predetermined value and indicates a second sign when the control signal is less than the predetermined value. (b) A signal processing circuit coupled with the input circuit and with the host device for presenting a substantially a zero value temperature-compensating signal when the ambient temperature is at a predetermined level, and for presenting the temperature-compensating signal substantially opposite in polarity with substantially equal magnitude as the temperature-indicating signal received at the first input locus when the ambient temperature is not at the predetermined level.

15 Claims, 5 Drawing Sheets

U.S. PATENT DOCUMENTS

| | | | |
|---|---|---|---|
| 6,509,726 B1 | 1/2003 | Roh | |
| 6,531,857 B2 | 3/2003 | Ju | |
| 6,542,027 B2 | 4/2003 | Zha et al. | |
| 6,549,065 B2 | 4/2003 | Opris | |
| 6,559,629 B1 | 5/2003 | Fernald | |
| 6,563,371 B2 | 5/2003 | Buckley, III et al. | |
| 6,566,850 B2 | 5/2003 | Heinrich | |
| 6,570,437 B2 | 5/2003 | Park et al. | |
| 6,590,372 B1 | 7/2003 | Wiles, Jr. | |
| RE38,250 E | 9/2003 | Slemmer et al. | |
| 6,614,209 B1 | 9/2003 | Gregoire, Jr. | |
| 6,614,305 B1 | 9/2003 | Ivanov et al. | |
| 6,617,836 B1 | 9/2003 | Doyle et al. | |
| 6,628,169 B2 | 9/2003 | Ivanov et al. | |
| 6,642,699 B1 | 11/2003 | Gregoire, Jr. | |
| 6,642,776 B1 | 11/2003 | Micheloni et al. | |
| 6,642,778 B2 | 11/2003 | Opris | |
| 6,661,713 B1 | 12/2003 | Kuo | |
| 6,677,808 B1 | 1/2004 | Sean et al. | |
| 6,680,643 B2 | 1/2004 | Conte et al. | |
| 6,690,083 B1 | 2/2004 | Mitchell et al. | |
| 6,690,228 B1 | 2/2004 | Chen et al. | |
| 6,700,226 B2 | 3/2004 | Vendrame et al. | |
| 6,710,641 B1 | 3/2004 | Yu et al. | |
| 6,737,908 B2 | 5/2004 | Mottola et al. | |
| 6,750,641 B1 | 6/2004 | Ivanov et al. | |
| 6,754,111 B2 | 6/2004 | Pekny | |
| 6,765,431 B1 | 7/2004 | Coady | |
| 6,768,139 B2 | 7/2004 | Fischer | |
| 6,771,055 B1 | 8/2004 | Bell | |
| 6,774,711 B2 | 8/2004 | Bernard | |
| 6,784,652 B1 | 8/2004 | Aude | |
| 6,788,041 B2 | 9/2004 | Gheorghe et al. | |
| 6,788,131 B1 | 9/2004 | Huang | |
| 6,812,684 B1 | 11/2004 | Leifhelm et al. | |
| 6,815,941 B2 | 11/2004 | Butler | |
| 6,828,847 B1 | 12/2004 | Marinca | |
| 6,841,982 B2 | 1/2005 | Tran | |
| 6,885,178 B2 * | 4/2005 | Marinca | 323/316 |
| 7,236,048 B1 * | 6/2007 | Holloway et al. | 327/539 |
| 2005/0073290 A1 * | 4/2005 | Marinca et al. | 323/907 |
| 2005/0128018 A1 * | 6/2005 | Meltzer | 331/176 |
| 2005/0248405 A1 * | 11/2005 | Tsuchi | 330/257 |

OTHER PUBLICATIONS

"Temperature Sensors and Voltage References Implemented in CMOS Technology," IEEE Sensors Journal, vol. 1, No. 3, Oct. 2001 (Gerard C. M. Meijer, Senior Member, IEEE, Guijie Wang, and Fabiano Fruett), pp. 225-234.

"The Piezojunction Effect in Silicon Sensors and Circuits and its Relation to Piezoresistance," IEEE Sensors Journal, vol. 1, No. 2, August 2001 (J. Fredrik Creemer, Fabiano Fruett, Gerard C. M. Meijer, Senior Member, IEEE, and Paddy J. French, Associate Member, IEEE), pp. 98-108.

"Minimization of the Mechanical-Stress-Induced Inaccuracy in Bandgap Voltage References," IEEE Journal of Solid-State Circuits, vol. 38, No. 7, Jul. 2003 (Fabiano Fruett, Gerard C. M. Meijer, and Anton Bakker), pp. 1288-1291.

"A 2-V 23-A 5.3-ppm/ C Curvature-Compensated CMOS Bandgap Voltage Reference," IEEE Journal of Solid-State Circuits, vol. 38, No. 3, Mar. 2003 (Ka Nang Leung, Member, IEEE, Philip K. T. Mok, Senior Member, IEEE, and Chi Yat Leung, Student Member, IEEE), pp. 561-564.

"Op-Amps and Startup Circuits for CMOS Bandgap References With Near 1-V Supply," IEEE Journal of Solid-State Circuits, vol. 37, No. 10, Oct. 2002 (Andrea Boni, Member, IEEE), pp. 1339-1343).

"A Robust Smart Power Bandgap Reference Circuit for Use in an Automotive Environment," IEEE Journal of Solid-State Circuits, vol. 37, No. 7, Jul. 2002 (Wolfgang Horn and Heinz Zitta), pp. 949-952.

"A Sub-1-V 15-ppm/ C CMOS Bandgap Voltage Reference Without Requiring Low Threshold Voltage Device," IEEE Journal of Solid-State Circuits, vol. 37, No. 4, Apr. 2002 (Ka Nang Leung, Student Member, IEEE, and Philip K. T. Mok, Senior Member, IEEE), pp. 526-530.

"A 1.8-V Modulator Interface for an Electret Microphone With On-Chip Reference," IEEE Journal of Solid-State Circuits, vol. 37, No. 3, Mar. 2002 (Ovidiu Bajdechi, Student Member, IEEE, and Johan H. Huijsing, Fellow, IEEE), pp. 279-285.

"A CMOS Bandgap Reference Without Resistors," IEEE Journal of Solid-State Circuits, vol. 37, No. 1, Jan. 2002 (Arne E. Buck, Member, IEEE, Charles L. McDonald, Member, IEEE, Stephen H. Lewis, Fellow, IEEE, and T. R. Viswanathan, Fellow, IEEE), pp. 81-83.

"Curvature-Compensated BiCMOS Bandgap with 1-V Supply Voltage," IEEE Journal of Solid-State Circuits, vol. 36, No. 7, Jul. 2001 (Piero Malcovati, Franco Maloberti, Fellow, IEEE, Carlo Fiocchi, and Marcello Pruzzi), pp. 1076-1081.

"Low-Power Bandgap References Featuring DTMOST's," IEEE Journal of Solid-State Circuits, vol. 34, No. 7, Jul. 1999 (Anne-Johan Annema), pp. 949-955.

"A CMOS Bandgap Reference Circuit with Sub-1-V Operation," IEEE Journal of Solid-State Circuits, vol. 34, No. 5, May 1999 (Hironori Banba, Hitoshi Shiga, Akira Umezawa, Takeshi Miyaba, Toru Tanzawa, Shigeru Atsumi, and Koji Sakui, Member, IEEE), pp. 670-674.

"A 1.1-V Current-Mode and Piecewise-Linear Curvature-Corrected Bandgap Reference," IEEE Journal of Solid-State Circuits, vol. 33, No. 10, Oct. 1998 (Gabriel A. Rincon-Mora and Phillip E. Allen), pp. 15511554.

"A Switched-Current, Switched-Capacitor Temperature Sensor in 0.6- m CMOS," IEEE Journal of Solid-State Circuits, vol. 33, No. 7, Jul. 1998 (Mike Tuthill), pp. 1117-1122.

"Exponential Curvature-Compensated BiCMOS Bandgap References," IEEE Journal of Solid-State Circuits, vol. 29, No. 11, Nov. 1994 (Inyeol Lee, Syudong Kim and Wonchan Kim), pp. 1396-1403.

"A Curvature-Corrected Low Voltage Bandgap Reference," IEEE Journal of Solid-State Circuits, vol. 28, No. 6, Jun. 1993 (Made Gunawan, Gerard C. Mm. Meijer, Jeroen Fonderie and Johan H. Huijsing), pp. 667-670.

"Design Techniques for IC Voltage Regulators Without P-N-P Transistors," IEEE Journal of Solid-State Circuits, vol. SC-22, No. 1, Feb. 1987 (Mark S. Birrittella, Member, IEEE, Robert R. Marley, Member, IEEE, and Keith D. Nootbaar, Member, IEEE), pp. 71-76.

"CMOS Voltage References Using Lateral Bipolar Transistors," IEEE Journal of Solid-State Circuits, vol. SC-20, No. 6, Dec. 1985 (Marc G. R. Degrauwe, Oskar N. Leuthold, Eric A. Vittoz, Member, IEEE, Henri J. Oguey, Member, IEEE, and Arthur Descombes, Member, IEEE), pp. 1151-1157.

"A Vbe(T) Model with Application to Bandgap Reference Design," IEEE Journal of Solid-State Circusts, vol. SC-20, No. 6, Dec. 1985 (S. L. Lin and C. A. T. Salama, Senior Member, IEEE), pp. 1283-1285.

"A Precision CMOS Bandgap Reference," IEEE Journal of Solid-State Circuits, vol. SC-19, No. 6, Dec. 1984(John Michejda and Suk K. Kim), pp. 1014-1021.

"A Precision Curvature-Compensated CMOS Bandgap Reference," IEEE Journal of Solid-State Circuits, vol. SC-18, No. 6, Dec. 1983 (Bang-Sup Song, StudentMember, IEEE,andPaul R. Gray, Fellow,IEEE), pp. 634-643.

"MOS Transistors Operated in the Lateral Bipolar Mode and Their Application in CMOS Technology." IEEE Journal of Solid-State Circuits, vol. SC-18, No. 3, Jun. 1983 (Eric A. Vittoz, Member, IEEE), pp. 273-279.

"A New Curvature-Corrected Bandgap Reference," IEEE Journal of Solid-State Circuits, vol. SC-17, No. 6, Dec. 1982 (Gerard C. M. Meijer, Peter C. Schmale, and Klaas Van Zalinge), pp. 1139-1143.

"Accurate Analysis of Temperature Effects in IC/V/BE Characteristics with Application to Bandgap Reference Sources," EEE Journal of Solid-Statecircuits, vol. SC-15, No. 6, Dec. 1980 (Yannis P. Tsividis, Member,IEEE), pp. 1076-1084.

"MOS Voltage Reference Based on Polysilicon Gate Work Function Difference." IEEE Journal of Solid-State Circuits, vol. SC-15, No. 3, Jun. 1980 (Henri J. Oguey, Member, IEEE, and Bernard Gerber), pp. 264-269.

"Measurement of the Temperature Dependence of the Ic(Vbe) Characteristics of Integrated Bipolar Transistors," IEEE Journal of Solid-Statecircuits, vol. SC-15, No. 2, Apr. 1980 (Gerard C. M. Meijer and Keelsfingerling), pp. 237-240.

"A Low-Voltage CMOS Bandgap Reference," IEEE Journal of Solid-State Circuits, vol. SC-14, No. 3, Jun. 1979 (Eric A. Vittoz, Member, IEEE, and Olivier Neyroud), pp. 573-577.

"An Integrated Bandgap Reference," IEEE Journal of Solid-State Circuits, Jun. 1976 (Gerard C. M. Meijer and Jan B. Verhoeff), pp. 403-406.

"A Simple Three-Terminal IC Bandgap Reference," IEEE Journal of Solid-Statecircuits, vol. SC-9, No. 6, Dec. 1974 (A. Paul Brokaw, Member, IEEE), pp. 388-393.

* cited by examiner

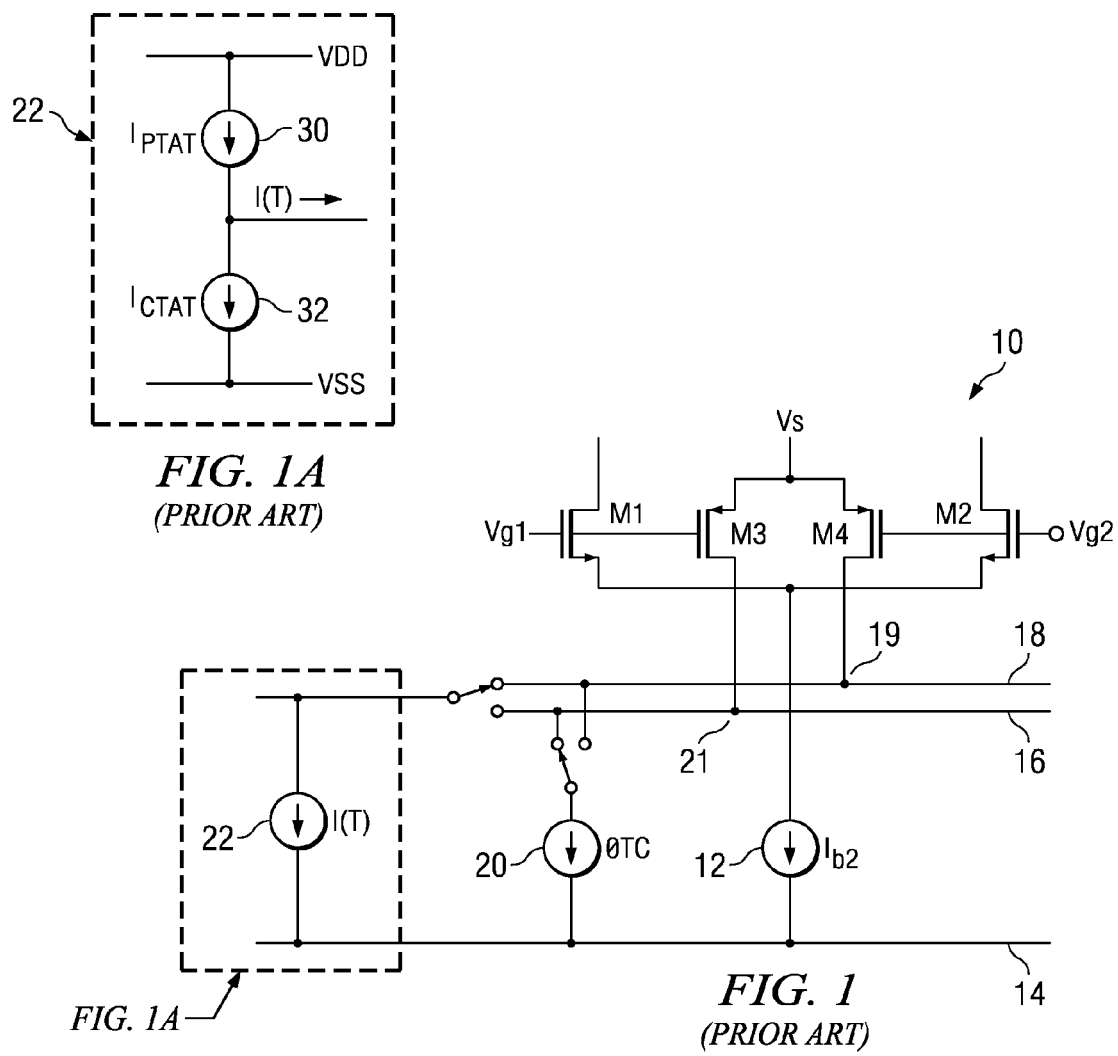
FIG. 1A
*(PRIOR ART)*
FIG. 1
*(PRIOR ART)*
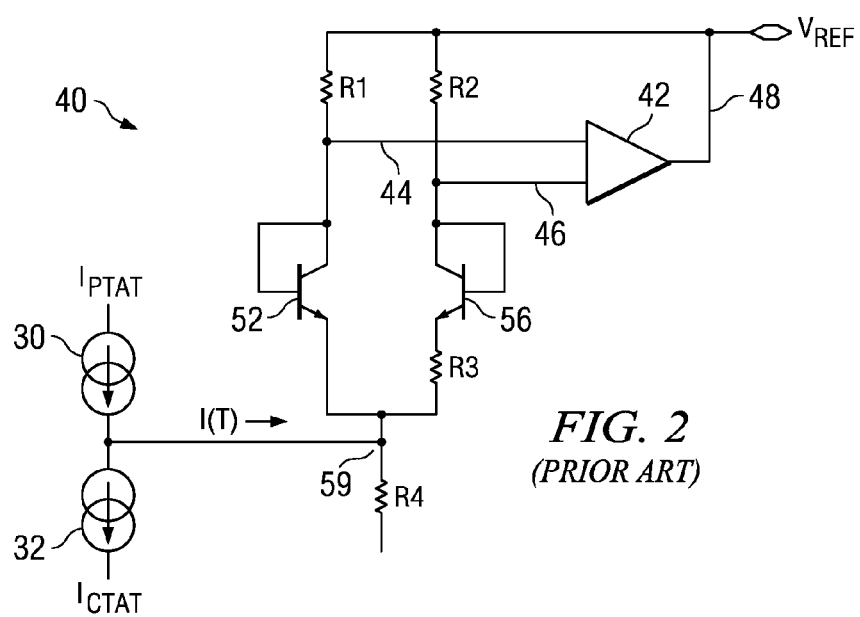
FIG. 2
*(PRIOR ART)*

APPARATUS AND METHOD FOR COMPENSATING CHANGE IN A TEMPERATURE ASSOCIATED WITH A HOST DEVICE

CROSS-REFERENCE TO RELATED APPLICATIONS

The present application is related to U.S. patent application Ser. No. 11/509,107 entitled "A CIRCUIT FOR GENERATING A TEMPERATURE DEPENDENT CURRENT WITH HIGH ACCURACY," filed Aug. 23, 2006, which is assigned to the current assignee hereof.

BACKGROUND

To reduce temperature drift in an analog circuit, a temperature dependent bias current I(T) may be used. Such bias currents are sometimes expressed as a current (I) function of temperature (T), I(T). The bias current I(T) may be generated from a PTAT (Proportional To Absolute Temperature) current-DAC (Digital to Analog Converter) connected to a CTAT (Complementary To Absolute Temperature) current-DAC. The CTAT current is subtracted from the PTAT current, or vice versa, to generate the desired bias current I(T). The resulting I(T) is injected into a sensitive node of the circuit to be compensated.

Temperature sensitive circuits may have both positive as well as negative residual temperature coefficients that need to be trimmed for high drift performance. Note that for a differential stage as in an operational amplifier input stage there are two "opposite" nodes which can be used to inject the temperature dependent current I(T) (i.e., drain node of each of the two input transistors, "injection nodes"). In such a differential circuit, it may be sufficient to generate one bias current I(T), for example with positive temperature coefficient, and to inject the one bias current I(T) into either of the two "injection nodes", depending on which type of compensation is desired. However in analog circuits having only one input node or in other circuits for some reason having an architecture offering only one "injection node", two bias currents I(T) have to be provided by the PTAT/CTAT current DAC to provide compensation for both positive and negative temperature coefficients.

If bias current I(T) is established so that I(T)=0 at an elevated temperature above a nominal or target operating temperature for a device, then bias current I(T) always flows in the same direction within a wide interval of operational temperature range. This design approach permits using one simple current mirror to change the sign of bias current I(T) current. Such a sign change may be required because a positive temperature coefficient in bias current I(T) is used to compensate a circuit having a negative temperature dependence, and a negative temperature coefficient in bias current I(T) is used to compensate circuits with a positive temperature dependence. As a result, prior art practice has heretofore provided for specifying the operation or performance of a circuit up to an elevated temperature, such as by way of example and not by way of limitation, 90° C.

However, this widely used prior art approach has disadvantages. At the normal operating temperature, a nonzero current (i.e., bias current I(T)≠0) is injected into a sensitive node. As a result, noise is increased. Further, good compensation for temperature dependence by the circuit can be guaranteed only up to the temperature where bias current I(T)=0. Above to the temperature where bias current I(T)=0 the current mirror used for temperature coefficient inversion may no longer work. By way of example and not by way of limitation, in a configuration of such a current mirror employing a PMOS mirror, the mirror cannot sink any current. Still further, the first trim action when preparing the circuit must be performed at the temperature where bias current I(T)=0. For this reason, a high temperature final package trim must be performed before the operating temperature test. This procedure does not allow easy implementation of graded units that have undergone a room temperature test only. That is, low price units that involve one test at operating temperature with standard trimming cannot be produced using the above procedure. Such a procedure—one test at operating temperature with standard trimming, followed by a test at high temperature to compensate residual drift, followed by another test at operating temperature to check initial accuracy—raises the price of a circuit well above a one-test-required part.

To be able to compensate both negative and positive temperature drifts, currents with both positive and negative temperature coefficients must be generated. Generating a biasing current to represent both positive and negative temperature coefficients is particularly difficult if the biasing current approaches zero and changes sign within the temperature operating range of the device for which compensation is being provided. In such a case involving sign changes of biasing current within an operating range, the entire circuit for generation of the I(T) biasing current has to be duplicated in order to ensure accurate generation of positive-correcting as well as negative-correcting biasing currents.

There is a need for an apparatus and method for compensating change in a temperature associated with a host device that injects substantially zero correction or compensating current into the host device at the nominal operating temperature of the host device.

There is a need for an apparatus and method for compensating change in a temperature associated with a host device that can invert or compensate for temperature dependency substantially across an entire operating temperature range for the host device.

SUMMARY

An apparatus for compensating temperature changes in a temperature associated with a compensated device includes: (a) An input circuit having a first input locus for receiving a temperature-indicating signal and a second input locus for receiving a sign-indicating signal. The temperature-indicating signal indicates magnitude of the temperature. The sign-indicating signal indicates a first sign when the ambient temperature is greater than a predetermined value and indicates a second sign when the temperature is less than the predetermined value. (b) A signal processing circuit coupled with the input circuit and with the host device for presenting a substantially a zero value temperature-compensating signal when the ambient temperature is at a predetermined level, and for presenting the temperature-compensating signal substantially opposite in polarity with substantially equal magnitude as the temperature-indicating signal received at the first input locus when the ambient temperature is not at the predetermined level. A method for compensating temperature changes in a temperature associated with a compensated device includes the steps of: (a) In no particular order: (1) providing an input circuit; the input circuit having a first input locus for receiving a temperature-indicating signal and a second input locus for receiving a sign-indicating signal; and (2) providing a signal processing circuit coupled with the input circuit and with the host device. (b) In no particular order: (1) arranging the temperature-indicating signal to indicate magnitude of the temperature; and (2) arranging the sign-indicating signal to indicate a first sign when the temperature is greater than a predetermined value, and to indicate a second sign when the temperature is less than the predetermined value. (c) In no particular order: (1) operating the signal processing circuit and the input circuit cooperatively to present a temperature-compensating signal substantially at a zero value when the ambient temperature is at a predetermined value; and (2) operating the signal processing circuit and the input circuit cooperatively to present the temperature-compensating signal substantially opposite in polarity than the temperature-indicating signal received at the first input locus when the ambient temperature is not at the predetermined level.

It is, therefore, an object of the present invention to provide an apparatus and method for compensating change in a temperature associated with a host device that injects substantially zero correction or compensating current into the host device at the nominal operating temperature of the host device.

It is a further object of the present invention to provide an apparatus and method for compensating change in a temperature associated with a host device that can invert or compensate for temperature dependency substantially across an entire operating temperature range for the host device.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram illustrating a prior art temperature dependent bias current and application of that bias current in an operational amplifier input stage;

FIG. 2 is a diagram illustrating a prior art temperature dependent bias current and application of that bias current in a bandgap circuit;

DETAILED DESCRIPTION

Figure 3:
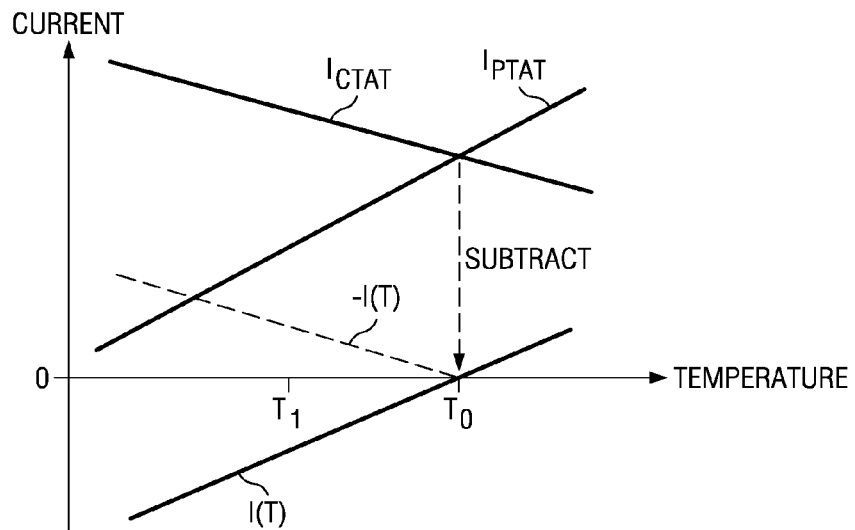
FIG. 3 is a graph representing a temperature dependent bias current for a prior art circuit.

Refer now to the drawings wherein depicted elements are, for the sake of clarity, not necessarily shown to scale and wherein like or similar elements are designated by the same reference numeral through the several views FIG. 1 is a diagram illustrating a prior art temperature dependent bias current and application of that bias current in an operational amplifier input stage. In FIG. 1, an operational amplifier input stage 10 includes an NMOS transistor M1 coupled between the operational amplifier (not shown in FIG. 1) and a current source 12 providing a current $I_{b2}$ and an NMOS transistor M2 coupled between the operational amplifier (not shown in FIG. 1) and current source 12. Current source 12 is coupled with a line 14. Input stage 10 also includes a PMOS transistor M3 coupled between a voltage source $V_S$ and a line 16, and a PMOS transistor M4 coupled between voltage source $V_S$ and a line 18. A gating signal $V_{g1}$ gates transistors M1 and M3. A gating voltage $V_{g2}$ gates transistors M2 and M4.

A current source 20 is configured for selectively coupling one of lines 16 and 18 with line 14 to impose a zero current bias at a predetermined temperature (OTC) on the selected coupled line 16 and 18. A temperature compensating current source 22 is configured for selectively coupling one of line 16 and 18 with line 14. Current sources 20 and 22 are configured in a manner precluding coupling of both of lines 16 and 18 with line 14 at the same time. Current source 22 is employed to inject a bias current I(T) into one of a sensitive drain node 19 and 21 in input stage 10 to reduce temperature drift in input stage 10.

Details of current source 22 are also illustrated in FIG. 1. Current source 22 includes a PTAT (Proportional To Absolute Temperature) current source 30 providing a current $I_{PTAT}$, and a CTAT (Complementary To Absolute Temperature) current source 32 providing a current $I_{CTAT}$. Currents $I_{PTAT}$ and $I_{CTAT}$ are subtracted, one from the other, to present a resulting bias current I(T). Bias current I(T) is injected at drain nodes 19 and 21 of input stage 10. A predetermined temperature $T_0$ is selected so that bias current $I(T_0)=0$.

FIG. 2 is a diagram illustrating a prior art temperature dependent bias current and application of that bias current in a bandgap circuit. In FIG. 2, a bandgap reference circuit 40 includes an amplifier 42 having a first input terminal or node 44, a second input terminal or node 46, and an output terminal or node 48. Each of the first input terminal 44 and the second input terminal 46 is coupled to a branch of a reference network. Typically, the first input terminal 44 is coupled to a resistor $R_1$ (which receives a reference voltage $V_{REF}$) and is coupled with a resistor $R_4$ via a diode-connected transistor 52 (which is generally a bipolar NPN transistor). Additionally, the second input terminal 46 is coupled to a resistor $R_2$ (which receives a reference voltage $V_{REF}$) and is coupled with a resistor $R_4$ via a resistor $R_3$ and a diode-connected transistor 56 (which is generally a bipolar NPN transistor). A bias current I(T) is injected into bandgap reference circuit 40 at a node 59, which is common with diode-connected transistor 52 and resistors $R_4$ and $R_{23}$. Bias current I(T) is provided from a current source substantially similar to current source 22 of FIG. 1 including a PTAT current source 30, and a CTAT current source 32.

FIG. 3 is a graph representing a temperature dependent bias current for a prior art circuit. In FIG. 3, current $I_{PTAT}$ and represents current $I_{CTAT}$ of FIGS. 1-2 are shown. Currents $I_{PTAT}$ and $I_{CTAT}$ are subtracted, one from the other, to present a resulting bias current I(T).

Figure 4:
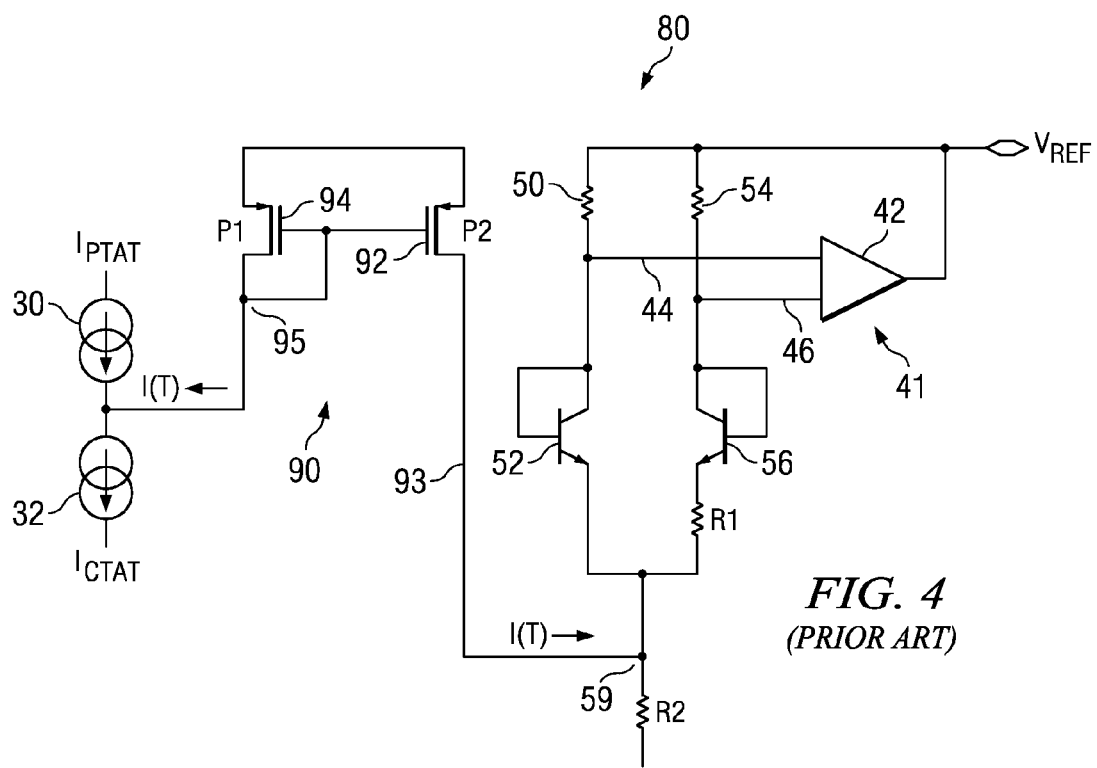
FIG. 4 is a diagram illustrating a prior art temperature dependent negative bias current and application of that negative bias current in a bandgap circuit.

FIG. 4 is a diagram illustrating a prior art temperature dependent negative bias current and application of that negative bias current in a bandgap circuit. In FIG. 4, a bandgap reference circuit 41 is compensated by a bias current generating circuit 80. Bandgap reference circuit 41 is substantially the same as bandgap reference circuit 40 (FIG. 2). In the interest of avoiding prolixity bandgap reference circuit 41 will not be described in detail.

Bias current generating circuit 30 includes a PTAT current source 32 providing a current $I_{PTAT}$, and a CTAT current source 84 providing a current $I_{CTAT}$. Currents $I_{PTAT}$ and $I_{CTAT}$ are subtracted, one from the other, to present a resulting bias current I(T). Bias current I(T) is injected at a node 59 of bandgap reference circuit 41. A current mirror 90 includes PMOS transistors 92 and 94. Current mirror 90 presents bias current I(T) from a node 93. Current mirror 90 mirrors a bias current –I(T) from a node 95 in an opposite direction from the direction of bias current I(T) presented at node 93. It is this mirroring of –I(T) by current mirror 90 that generates a negative temperature curve –I(T), represented by curve 72 in FIG. 3.

This approach for providing bidirectional temperature compensation has disadvantages. At operating temperature $T_1$, a non-zero current is injected to a sensitive node (e.g., node 59 of FIG. 4) so that noise is increased in the circuit being compensated. Further, accurate compensation of the circuit can only be effected up to the temperature at which I(T)=0 (e.g., temperature $T_0$ of FIG. 3). By way of example and not by way of limitation, above temperature $T_0$, current mirror 90 will not present bias current –I(T) because the PMOS implementation of current mirror 90 cannot sink current. Still further, a first trim operation in final preparation of a circuit to be compensated may, by way of example and not by way of limitation, be performed at temperature $T_0$. This means that a high temperature final package trim must be done first (at elevated temperature $T_0$) and then a second trim operation must be performed at operating temperature $T_1$. This multiple trim procedure does not permit easy implementation of graded units using a single operating temperature ($T_1$) trim and test operation alone. A consequence is a higher cost of production. A single test at operating temperature ($T_1$) using standard trimming is less expensive than a multi-test operation. Such a multi-test operation may involve, by way of example and not by way of limitation, a first test at operating temperature ($T_1$) using standard trimming, then a test at an elevated temperature ($T_0$) to compensate residual drift in the device being protected, followed by yet a third test at operating temperature ($T_1$) to check initial test accuracy.

Figure 5:
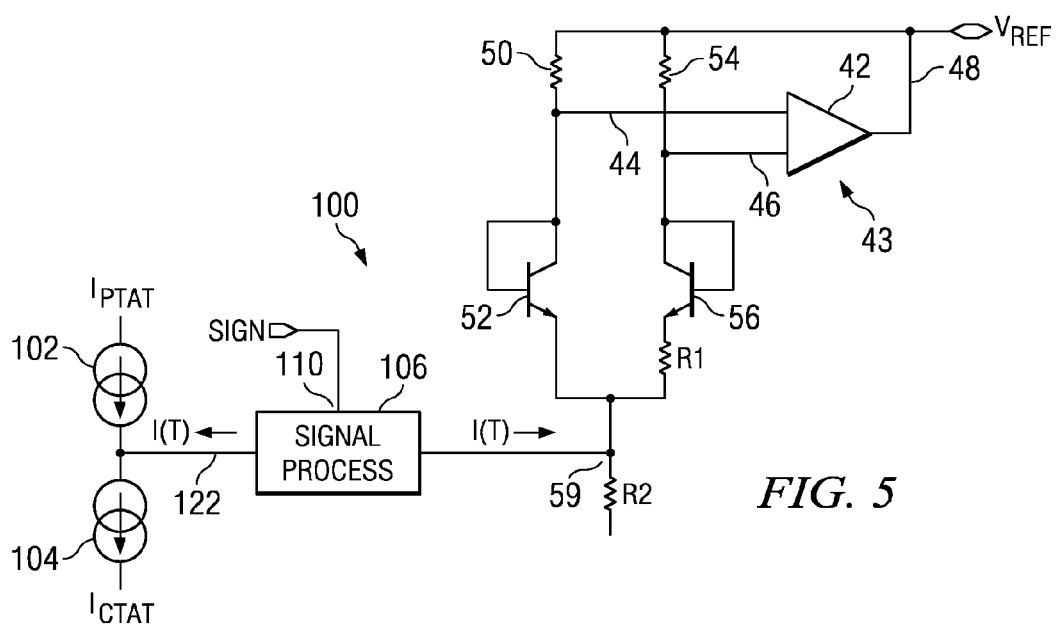
FIG. 5 is a diagram of a two-way temperature dependent bias current according to an embodiment of the present invention and application of that two-way bias current in a bandgap circuit.

FIG. 5 is a diagram of a two-way temperature dependent bias current according to an embodiment of the present invention and application of that two-way bias current in a bandgap circuit. In FIG. 5, a bandgap reference circuit 43 is compensated by a bias current generating circuit 100. Bandgap reference circuit 43 is substantially the same as bandgap reference circuit 40 of FIG. 2. In the interest of avoiding prolixity bandgap reference circuit 43 will not be described in detail.

Bias current generating circuit 100 includes a PTAT current source 102 providing a current $I_{PTAT}$, and a CTAT current source 104 providing a current $I_{CTAT}$. Currents $I_{PTAT}$ and $I_{CTAT}$ are subtracted, one from the other, to present a resulting bias current I(T) to a signal processing unit 106.

Signal processing unit 106 also receives a sign signal via a sign input node 110 modulating or controlling sign of bias current I(T) received from current sources 102 and 104. Signal processing unit 106 cooperates with current sources 102 and 104 to present bias current signal I(T) to node 59 substantially as bias current signal I(T) is received by signal processing unit 106 when the sign signal received at sign input node 110 indicates a first sign. Signal processing unit 106 cooperates with current sources 102 and 104 to present an inverted bias current signal –I(T) to node 59 when the sign signal received at sign input node 110 indicates a second sign. Inverted bias current signal –I(T) is substantially opposite in polarity or inverted with respect to bias current signal I(T) as received by signal processing unit 106

It is preferred that bias current generating circuit 100 be employed having arranged $I(T_1)=0$. That is, it is preferred that bias current I(T)=0 at the normal operating temperature ($T_1$) of the device being compensated (e.g., bandgap reference circuit 43 of FIG. 5). A significant result of setting $I(T_1)=0$ is that injected current at node 59 is zero at normal operating temperature. No additional noise is injected into the circuit being compensated by bias current I(T) at normal operating temperature $T_1$.

As mentioned earlier, a shortcoming of bias current generating circuit 80 of FIG. 4 is that bias current generating 80 of FIG. 4 fails to provide compensation above temperature $T_0$ because the PMOS implementation of current mirror 90 cannot sink current. A straightforward solution to that shortcoming would be establish a second bias current generating circuit substantially similar to bias generating circuit 80, but switching employment of currents $I_{PTAT}$, and $I_{CTAT}$ so that the duplicate bias current generating circuit would present a bias current signal –I(T). Such a duplicative solution disadvantageously occupies additional space (e.g., silicon chip area) and requires additional power for its implementation and operation.

Bias current generating circuit 100 avoids such a duplicative solution by providing a small additional circuit (contained within signal process unit 106) that operates for all temperatures to invert any temperature dependent current I(T), even if the zero crossing of the temperature dependent current I(T) is within the operating range of the circuit being compensated.

Figure 6:
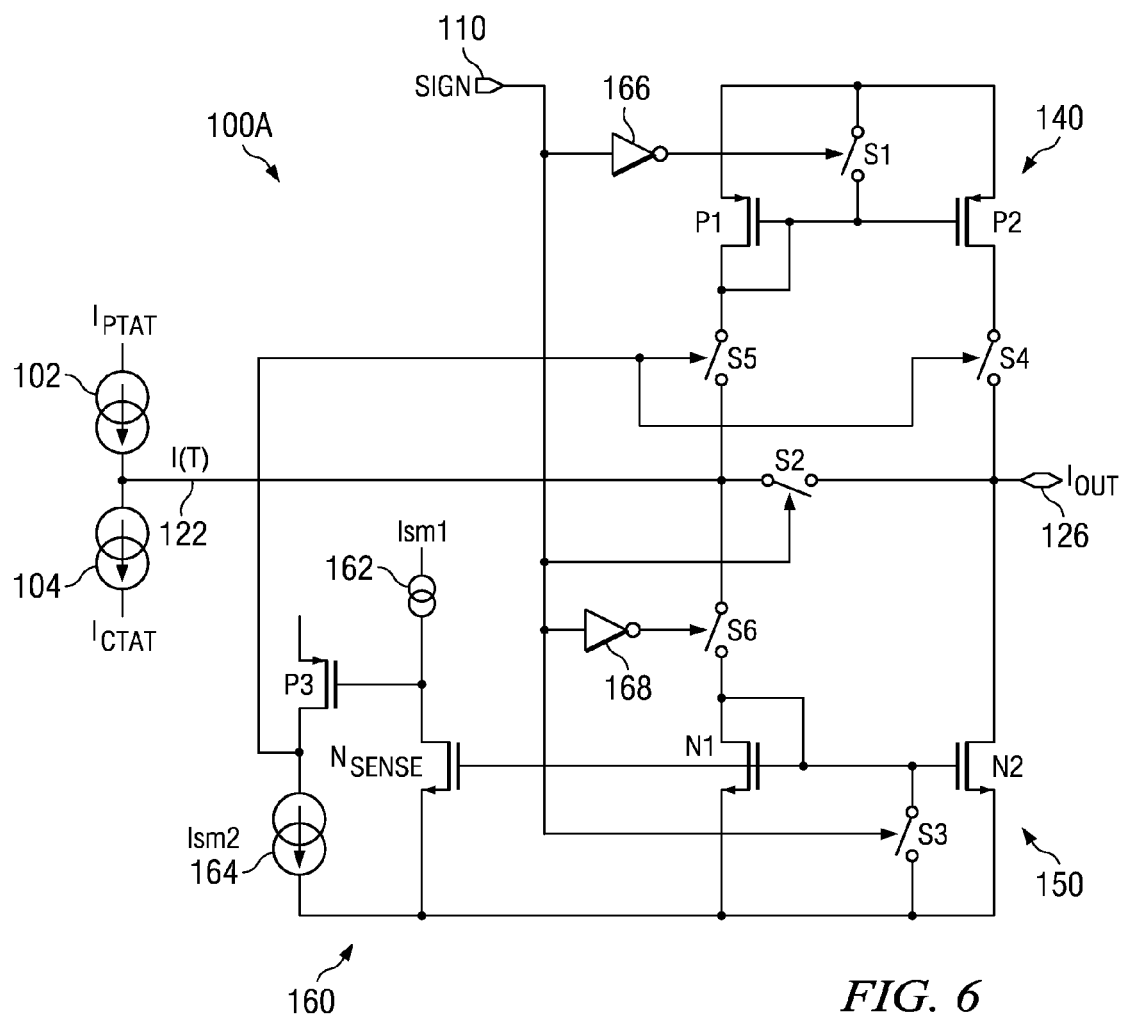
FIG. 6 is a illustrating the details of a generator of a two-way temperature dependent bias current according an embodiment to the present invention.

FIG. 6 is a diagram illustrating the details of a first embodiment of a generator of a two-way temperature dependent bias current according to the present invention. In FIG. 6, a bias current generator circuit 100A includes a current level input node 122 and a sign input node 110. The output of circuit 100A is generally coupled with a sensitive node of a circuit being compensated (e.g., node 59 of FIG. 5). A PTAT current source 102 provides a current $I_{PTAT}$, and a CTAT current source 104 provides a current $I_{CTAT}$. Currents $I_{PTAT}$ and $I_{CTAT}$ are subtracted, one from the other, to present a resulting bias current I(T) to input node 122.

A first current mirror circuit 140 includes PMOS transistors P1, P2. An enabling switch S1 controls gating signals to first current mirror circuit 140. A second current mirror circuit 150 includes PMOS transistors N1 and N2. An enabling switch S3 controls gating signals to second current mirror circuit 150. Connection between input node 122 and the output is controlled by a switch S2. The first current mirror circuit 140 is, preferably, coupled to a switch network. The switch network is generally comprised of switches S4, S5, and S6. The second current mirror circuit 150 is also preferably coupled to the switch network. A sensing unit 160 is coupled to the second current mirror 150 for sensing whether transistor N1 is conducting current. Sensing circuit 160 includes an NMOS transistor $N_{SENSE}$ and a PMOS transistor P3. Transistor $N_{SENSE}$ is coupled in series with a current source 162 providing a first reference current $I_{SM1}$. Transistor P3 is coupled in series with a current source 164 providing a second reference current $I_{SM2}$. First reference current $I_{SM1}$ is provided as a gating signal to transistor P3. Enabling switch S3 controls gating signals to transistors N1, N2, and $N_{SENSE}$.

Switches S4 and S5 (which can be PMOS transistors) are controlled by an output signal from transistor P3. Sign indicating or control signals received at sign input node 110 are provided to control switches S2 and S3 (which can be NMOS transistors). Sign indicating signals received at sign input node 124 are also provided to inverter 166 and 168. Inverters 166 and presents an inverted or an inverse of the sign signal for controlling switch S1 and S6, respectively. Additionally, switch S1 may be PMOS transistor, while switch S6 may be NMOS transistor.

When a sign indicating signal received at sign input node 110 is a "1", switch S2 is closed (i.e., conducting). In this orientation bias current generating circuit 100A passes the input signal I(T) presented at input node 122 directly to the output. A sign indicating signal "1" is also used to power-down the rest of bias current generating circuit 120. That is, a sign indicating signal "1" is inverted by inverter unit 166 to turn off switch S1, while the "1" turns on switch S3, thereby disabling current mirrors 140 and 150. It is preferred that switch S6 also be disabled (not conducting) in this operation mode to avoid any cross current over switch S3; this is effected by providing an inverted sign signal "1" from inverter unit 168 to turn off switch S6.

As mentioned earlier herein, when a sign indicating signal received at sign input node 110 is a "1", switch S2 is closed (i.e. conducting), and both current mirrors 140 and 150 are not active. If bias current I(T) is positive then bias current +I(T) flows from current sources 102 and 104 toward input node 122. Positive bias current +I(T) would flow into any circuit node of a circuit being compensated that is connected with the output (e.g., node 59 of FIG. 5). If bias current I(T) is negative, then bias current –I(T) flows from input node 122 toward current sources 102 and 104. Negative bias current –I(T) would flow out of any circuit node of a circuit being compensated that is connected with the output (e.g., node 59 of FIG. 5). In summary, if a sign indicating signal received sign input node 110 equals "1", the currents at node 122 and the output will have the same polarity and magnitude. Thus, when a sign indicating signal received sign input node 110 equals "1", the temperature coefficient of the bias current I(T) is preserved by current generating circuit 120.

Inversion of the temperature coefficient is controlled by presence of a sign signal at sign input node 110. A sign indicating signal of "0" operates to turn off switch S2 thereby interrupting the current path between input node 110 and the output. A "0" activates current mirrors 140 and 150. A "0" also operates to turn on switches S4, S5, and S6 so that switches S4, S5, and S6 are conducting.

When a sign indicating signal received at sign input node 110 is a "0", switch S2 is open (i.e., turned off; not conducting); however current mirrors 140 and 150 are active. If bias current I(T) is positive then bias current +I(T) flows from current sources 102 and 104 toward input node 122. Positive bias current +I(T) would flow into any circuit node of a circuit being compensated that would be connected directly to input node 122 if circuit 100A would not be present (e.g., node 59 of FIG. 5). Bias current generating circuit 100A effects fully sinking bias current +I(T) by NMOS transistor N1 and mirroring bias current +I(T) to transistor N2 in second current mirror 150. This sinking and mirroring pulls a current of same magnitude as +I(T) out of output node 126. When bias current I(T) is selected so that +I(T) and –I(T) cross substantially at the nominal or expected operating temperature $T_1$ of the circuit being compensated, there is a net zero resultant bias current provided to an injection node of a circuit being compensated (e.g., node 59 of FIG. 5) at the nominal or expected operating temperature $T_1$ of the circuit being compensated.

Transistor $N_{SENSE}$ is employed to verify that transistor N1 is conducting current. If transistor N1 is conducting current, transistor $N_{SENSE}$ is able to sink the current through second current mirror 150 (which is large compared to the small reference current $I_{SM1}$) so long as current in transistor N1 is sufficiently larger than small reference current $I_{SM1}$. When transistor N1 is conducting, gate voltage of transistor P3 is low. In that configuration, transistor P3 is sourcing more current than small reference current $I_{SM2}$ so that a high output signal is provided from transistor P3 to turn off switches S4 and S5. Turning off switches S4 and S5 permits first current mirror 140 to contribute to the signal path between node 122 and the output. In summary, a "0" controls operation of current mirrors 140 and 150 to effect inverting direction of bias current I(T) at the nominal or expected operating temperature $T_1$ of the circuit being compensated. There is, therefore, presented a net zero resultant bias current to an injection node of a circuit being compensated (e.g., node 59 of FIG. 5) at the nominal or expected operating temperature $T_1$ of the circuit being compensated.

When a sign indicating signal received at sign input node 110 is a "0", switch S2 is open (turned off). If bias current I(T) is negative then bias current –I(T) flows toward current sources 102 and 104 from input node 122. Negative bias current –I(T) would flow out of any circuit node of a circuit being compensated that would be directly connected with input node 122 if circuit 100A would not be present (e.g., node 59 of FIG. 5). Second current mirror 150 is not able to source this current. The sensor transistor $N_{SENSE}$ does not conduct any current except from small leakage currents. As soon as the current through transistor $N_{SENSE}$ is smaller than small reference current $I_{SM1}$, the gate voltage of transistor P3 goes high. Transistor P3 is therefore sourcing less current than small reference current $I_{SM2}$, and the signal from transistor P3 to switches S4 and S5 is low. The low signal from transistor P3 turns on switches S4 and S5. In this configuration transistor P1 sources bias current I(T) and mirrors bias current I(T) to transistor P2 so that bias current +I(T) is flowing through transistor P2 into the injection node of a circuit being compensated that is connected with the output (e.g., node 59 of FIG. 5).

In this manner, responding to bias current I(T) presented at input node 122 and to a sign or control signal presented at sign input node 110, bias current generating circuit 100A employs signal processing to present the temperature indicating signal I(T) to the output substantially as received at input node 122 when the sign has a first value (such as "1") and presents a bias signal having substantially opposite polarity to the output when the sign indicating signal has a second value (such as "0"). Bias current I(T) is designed for presenting a value substantially equal with zero at a nominal or expected operating temperature of a circuit being compensated. The direction of bias current I(T) is reversed or inverted when the temperature associated with the circuit being compensated (e.g., the ambient temperature in which the circuit being compensated is operating) is greater than or less than the nominal or expected operating temperature.

In order to reduce oscillation around the point I(T)=0 (i.e., the nominal or expected operating temperature $T_1$ of the circuit being compensated), some hysteresis should be included in the feedback path established by transistors $N_{SENSE}$ and P3 and switch S4. Because the injected current at the junction of the circuit being compensated is close to zero around this point (temperature=$T_1$), the switching between "on" state and "off" state of switches S4 and S5 may be a problem because such state changes may add noise. Aside from switching between "on" state and "off" state of switches S4 and S5, only small currents of value $I_{SM1}$, $I_{SM2}$ are turned on and off and should not contribute any significant noise. The desired hysteresis may be provided by choosing two different values for current $I_{SM1}$ dependent on the logical value of the signal provided by transistor P3 for controlling switches S4 and S5. By way of example and not by way of limitation, if the signal provided by transistor P3 goes low, an additional current $I_{SM1B}$ may be switched on in parallel with current $I_{SM1}$.

Bias current generating circuit 100A can be implemented in several variants. By way of example and not by way of limitation, current mirrors 140 and 150 may be replaced by cascoded mirrors to improve output resistance. One variant of bias current generating circuit-100A is illustrated in FIG. 7.

Figure 7:
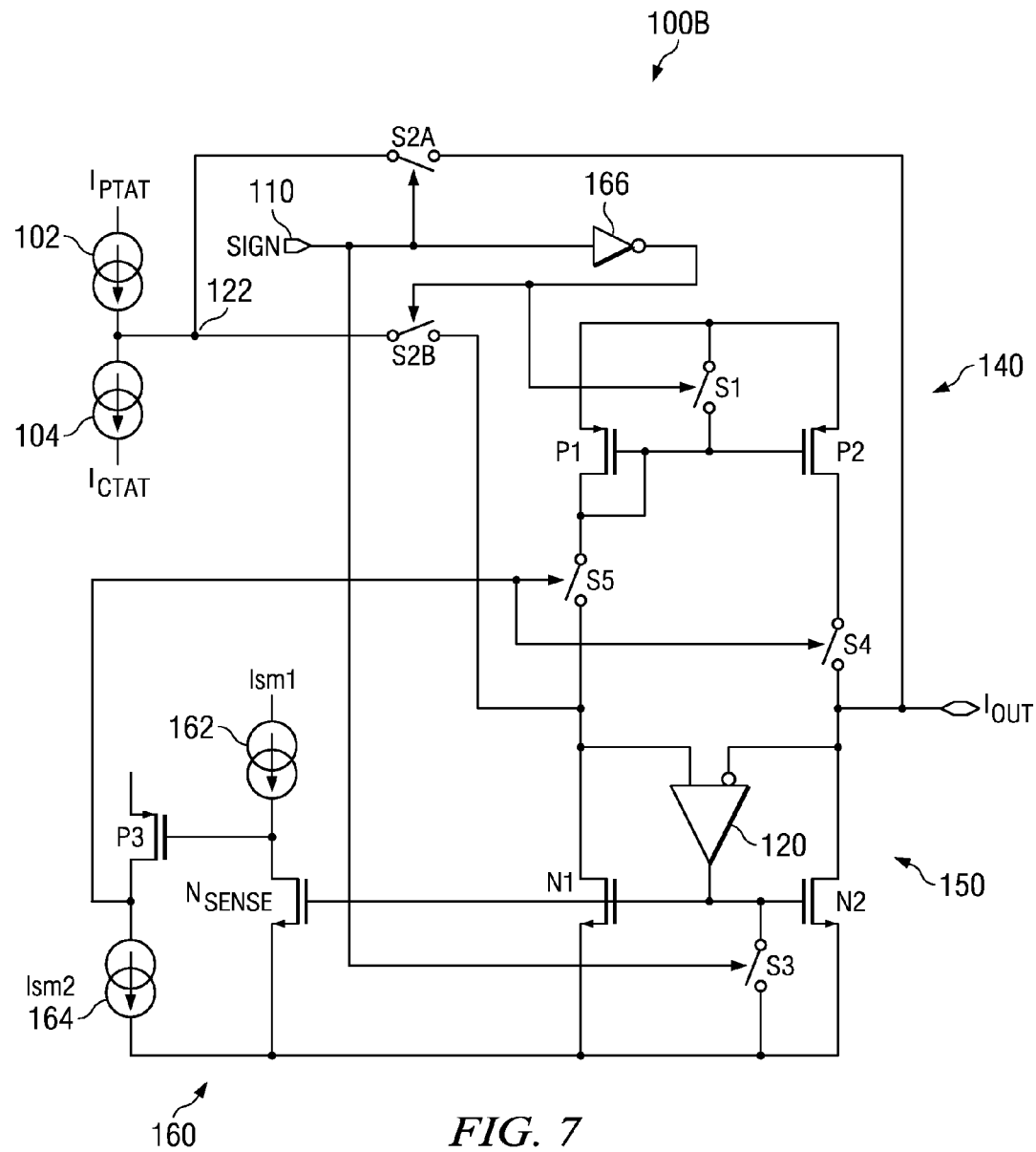
FIG. 7 is another diagram illustrating the details of a generator of a two-way temperature dependent bias current according to an embodiment of the present invention.

FIG. 7 is another diagram illustrating the details of a generator of a two-way temperature dependent bias current according to an embodiment of the present invention. In FIG. 7, a bias current generator circuit 100B is similar to bias current generating unit 100A of FIG. 6. Bias current generator circuit 100B includes a current level input node 122, a sign input node 124, and an output. Similarly, the output is coupled with a sensitive node of a circuit being compensated (e.g., node 59 of FIG. 5). A PTAT current source 102 provides a current $I_{PTAT}$, and a CTAT current source 104 provides a current $I_{CTAT}$. Currents $I_{PTAT}$ and $I_{CTAT}$ are subtracted, one from the other, to present a resulting bias current I(T) to input node 122. Additionally, circuit 100B includes similar components (such as current mirrors 140 and 150) that are described above with respect to circuit 100A of FIG. 6; thus, for the sake of simplicity, the general arrangement of these components is not repeated.

Some differences between the circuit 100A of FIG. 6 and circuit 100B are the use of switches S2A and S2B and amplifier 120. Preferably, these components replace inverter 168 and switches S6 and S2 of FIG. 6. Switch S2A (which may be a PMOS transistor) is coupled between input node 122 and the output and is actuated by the sign indicating signal. Switch S2B (which can be a PMOS transistor) is coupled between the input node 122 and the drain of transistor N1. Amplifier 120 has a first input terminal that is coupled to the drain of transistor N1, has a second input terminal that is coupled to (and inverts) the drain of transistor N2, and has its output terminal coupled to the gates of transistors N1 and N2.

When a sign indicating signal is a "1", switch S2A is closed (i.e., conducting), along with switch S3. In this orientation bias current generating circuit 100B passes the input signal I(T) presented at input node 122 directly to the output. A "1" is also used to power-down the rest of bias current generating circuit 100B. That is, a "1" is inverted by inverter 166 to turn off switch S1 and S2B.

Inversion of the temperature coefficient is controlled by presence of a sign signal at sign input node 110. A "0" operates to turn off switch S2A thereby interrupting the current path between input node 122 and the output. A "0" activates current mirrors 140 and 150. In this configuration, gating of transistors P1, P2 can be carried out to operate current mirror 140 and gating of transistors N1, N2 can be carried out to operate current mirror 150. A "0" also operates to turn on switches S4 and S5 so that switches S4 and S5 are conducting.

When a sign indicating signal is a "0", switch S2A is open (turned off) and switch S2B is closed (turned on). If bias current I(T) is positive then bias current +I(T) flows from current sources 102 and 104 toward input node 122. Positive bias current +I(T) would flow into any circuit node of a circuit being compensated that would be directly connected with input node 122 if circuit 100B would not be present (e.g., node 59 of FIG. 5). Bias current generating circuit 100B effects fully sinking bias current +I(T) by NMOS transistor N1 and mirroring bias current +I(T) to transistor N2 in second current mirror 150. This sinking and mirroring pulls a current of same magnitude as +I(T) out of output node 126. When bias current I(T) is selected so that +I(T) and −I(T) cross substantially at the nominal or expected operating temperature $T_1$ of the circuit being compensated, there is a net zero resultant bias current provided to an injection node of a circuit being compensated (e.g., node 59 of FIG. 5) at the nominal or expected operating temperature $T_1$ of the circuit being compensated.

Transistor $N_{SENSE}$ is employed to verify that transistor N1 is conducting current. If transistor N1 is conducting current, transistor $N_{SENSE}$ is able to sink the current through second current mirror 150 (which is large compared to the small reference current $I_{SM1}$) so long as current in transistor N1 is sufficiently larger than small reference current $I_{SM1}$. When transistor N1 is conducting, gate voltage of transistor P3 is low. In that configuration, transistor P3 is sourcing more current than small reference current $I_{SM2}$ so that a high output signal is provided from transistor P3 to turn off switches S4 and S5. Turning off switches S4 and S5 permits first current mirror 140 to contribute to the signal path between node 122 and the output. In summary, a "0" controls operation of current mirrors 140 and 150 to effect inverting direction of bias current I(T) at the nominal or expected operating temperature $T_1$ of the circuit being compensated. There is therefore presented a net zero resultant bias current to an injection node of a circuit being compensated (e.g., node 59 of FIG. 5) at the nominal or expected operating temperature $T_1$ of the circuit being compensated.

When a sign indicating signal is a "0", switch S2A is open (turned off) and switch S2B is closed (turned on). If bias current I(T) is negative then bias current −I(T) flows toward current sources 102 and 104 from input node 122. Negative bias current −I(T) would flow out of any circuit node of a circuit being compensated that would be directly connected with input node 122 if circuit 100B would not be present (e.g., node 59 of FIG. 5). Second current mirror 150 is not able to source this current. The sensor transistor $N_{SENSE}$ does not conduct any current except from small leakage currents. As soon as the current through transistor $N_{SENSE}$ is smaller than small reference current $I_{SM1}$, the gate voltage of transistor P3 goes high. Transistor P3 is therefore sourcing less current than small reference current $I_{SM2}$, and the signal from transistor P3 to switches S4 and S5 is low. The low signal from transistor P3 turns on switches S4 and S5. In this configuration transistor P1 sources bias current I(T) and mirrors bias current I(T) to transistor P2 so that bias current +I(T) is flowing through transistor P2 into the injection node of a circuit being compensated that is connected with output (e.g., node 59 of FIG. 5).

In this manner, responding to bias current I(T) presented at input node 122 and to a sign signal presented at sign input node 124, bias current generating circuit 100B employs signal processing to present the temperature indicating signal I(T) to the output substantially as received at input node 122 when the sign has a first value (such as "1") and presents a bias signal having substantially opposite polarity to the output when the sign indicating signal has a second value (such as "0"). Bias current I(T) is designed for presenting a value substantially equal with zero at a nominal or expected operating temperature of a circuit being compensated. The direction of bias current I(T) is reversed or inverted when the temperature associated with the circuit being compensated (e.g., the ambient temperature in which the circuit being compensated is operating) is greater than or less than the nominal or expected operating temperature.

In order to reduce oscillation around the point I(T)=0 (i.e., the nominal or expected operating temperature $T_1$ of the circuit being compensated), some hysteresis should be included in the feedback path established by transistors $N_{SENSE}$ and P3 and switch S4. Because the injected current at the junction of the circuit being compensated is close to zero around this point (temperature=$T_1$), the switching between "on" state and "off" state of switches S4 and S5 may be a problem because such state changes may add noise. Aside from switching between "on" state and "off" state of switches S4 and S5, only small currents of value $I_{SM1}$ and $I_{SM2}$ are turned on and off and should not contribute any significant noise. The desired hysteresis may be provided by choosing two different values for current $I_{SM1}$ dependent on the logical value of the signal provided by transistor P3 for controlling switches S4 and S5. By way of example and not by way of limitation, if the signal provided by transistor P3 goes low, an additional current $I_{SM1B}$ may be switched on in parallel with current $I_{SM1}$.

Output resistance of second current mirror 150 is increased by gain of amplifier 120. As a result no switch is required at drain of transistor N1 (i.e., no switch S6 is required, as in bias current generating circuit 120 of FIG. 6) because no direct current path exists between drain of transistor N1 and switch S3 (as is the case in bias current generating circuit 120 of FIG. 6). It is preferred that amplifier 120 be embodied in a single stage differential pair configuration with small tail current so that current through switch S3 (when switch S3 is conducting) is always equal with or smaller than the tail current of amplifier unit A1. In this configuration, no large current spike can occur in second current mirror 150. Even a small dissipation of tail current from amplifier 120 through switch S3 may be avoided by a proper power down of amplifier 120 by a sign input signal. In particular, in FIG. 7 switching paths for sign signals "1" and "0" are implemented just before bias signal I(T) enters the combination circuit including current mirrors 140 and 150. In this configuration, depending on the value of the sign signal bias current I(T) is either transferred by switch S2A directly to the output of transferred by switch S2B to the sign inverting stage comprising current mirrors 140 and 150 to present bias current –I(T) at the output.

Figure 8:
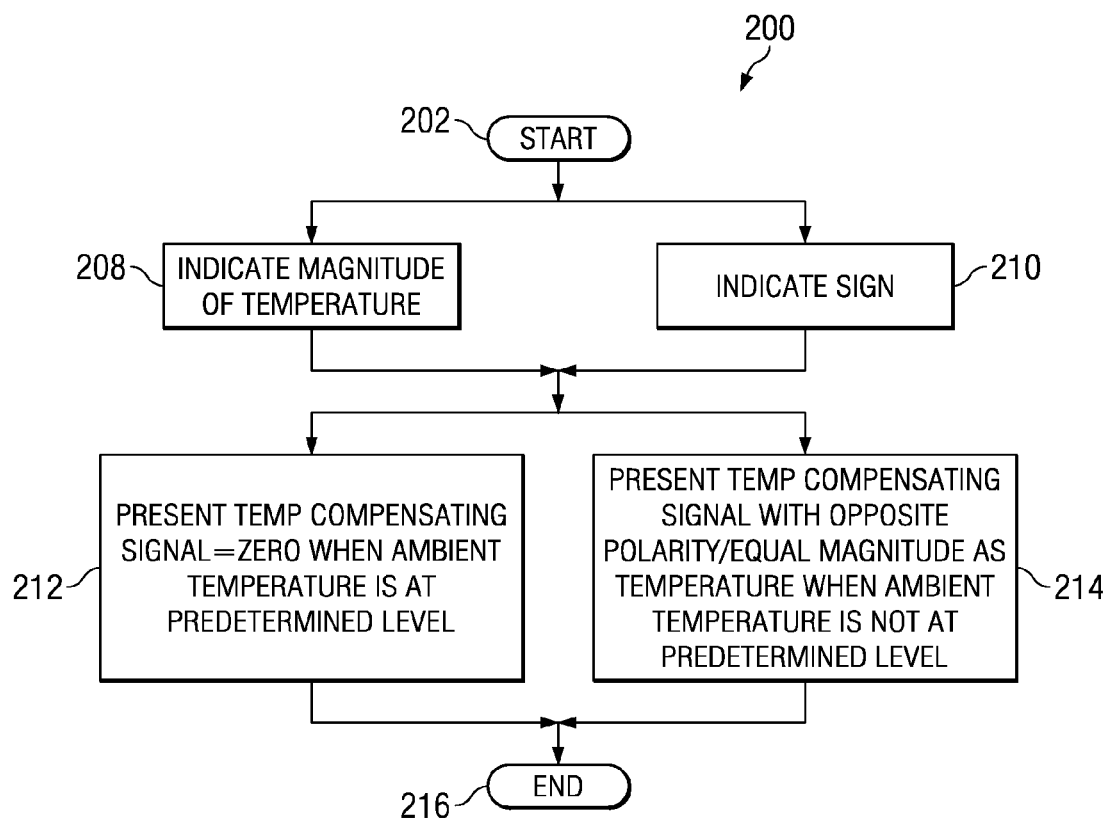
FIG. 8 is a flow chart illustrating the method according to an embodiment of the present invention.

FIG. 8 is a flow chart illustrating the method of an embodiment of the present invention. In FIG. 8, a method 200 for compensating temperature changes in ambient temperature associated with a compensated device begins at a START 202. Method 200 continues with the steps of, in no particular order: (1) Arranging the temperature-indicating signal to indicate magnitude of the ambient temperature, as indicated by a block 208. (2) Arranging the sign-indicating signal to indicate a first sign when a control signal is greater than a predetermined value, and to indicate a second sign when the control signal is less than the predetermined value, as indicated by a block 210. The control signal may be generated internally or externally. An example of an internally generated control signal may be, by way of example and not by way of limitation, a predetermined desired operating temperature. An example of an externally generated control signal may be, by way of example and not by way of limitation, a predetermined desired ambient temperature.

Method 200 continues with the steps of, in no particular order: (1) Operating the signal processing circuit and the input circuit cooperatively to present a temperature-compensating signal substantially at a zero value when the ambient temperature is at a predetermined level, as indicated by a block 212. (2) Operating the signal processing circuit and the input circuit cooperatively to present the temperature-compensating signal substantially opposite in polarity with substantially equal magnitude as the temperature-indicating signal received at the first input node when the ambient is not at the predetermined level, as indicated by a block 214. Method 200 terminates at an END.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

I claim:

1. An apparatus comprising:
   an output circuit;
   a bias generator having:
     a first current source;
     a second current source coupled to the first current source;
     a first switch coupled to the output circuit and coupled to the node between the first and the second current sources, wherein the first switch is actuated by an inverse of a control signal;
     a first current mirror having a second switch that deactivates the first current mirror when actuated, wherein the second switch is actuated by the control signal;
     a switch network that is coupled to at least a portion of the first current mirror and that is coupled to the first switch;
     a second current mirror having:
       a third switch that deactivates the second current mirror when actuated;
       a first FET that is diode-connected and that is coupled to switch network at its drain; and
       a second FET that is coupled to the switch network at its drain, that is coupled to the source of the first FET at its source, and that is coupled to the gate of the first FET at its gate, wherein the third switch is coupled to the nodes between the gates of the first and the second FETs and to the node between the sources of the first and second FETs;
     a third FET that is coupled to the sources of the first and second FETs at its source and that is coupled to the gates of the first and second FETs at its gate;
     a third current source that is coupled to the drain of the third FET;
     a fourth FET that is coupled to the node between the third current source and the third FET at its gate; and
     a fourth current source that is coupled between the drain of the fourth FET and the sources of the first and second FETs.

2. The apparatus of claim 1, wherein switch network is coupled across a first terminal and a second terminal of the first current mirror and coupled across a first terminal and a second terminal of the second current mirror.

3. The apparatus of claim 2, wherein the first switch is coupled between the first and second terminals of the first current mirror and coupled between the first and second terminals of the second current mirror.

4. The apparatus of claim 2, wherein the switch network further comprises:
   a fourth switch that is coupled to the second terminal of the first current mirror and coupled to the second terminal of the second mirror, wherein the first switch is coupled to the node between fourth switch and the second terminal of the second current mirror, and wherein the fourth switch is actuated by the sensing circuit; and a fifth switch that is coupled to the first terminal of the first current mirror, wherein the fifth switch is actuated by the sensing circuit.

5. The apparatus of claim 4, wherein the switch network further comprises a sixth switch that is coupled between the fifth switch and the first terminal of the second current mirror, wherein the sixth circuit is actuated by the inverse of the control signal.

6. The apparatus of claim 1, wherein the apparatus further comprises an amplifier having its inputs coupled to the drains of the first and second FETs and having its output coupled to the node between the gates of the first and second FETs.

7. The apparatus of claim 1, wherein the output circuit further comprises a bandgap circuit further having:
   a reference network that is coupled to the second switch; and
   an amplifier having a plurality of input terminals and an output terminal, wherein the input terminals of the amplifier and the output terminal are coupled to the reference network.

8. The apparatus of claim 7, wherein the reference network further comprises a plurality of branches that are each coupled to the output terminal and at least one input terminal.

9. An apparatus comprising:
   a bandgap reference circuit that outputs a reference voltage;
   a bias generator having:
      a first current source;
      a second current source coupled to the first current source;
      a first FET that is diode-connected; and
      a second FET that is coupled to the source of the first FET at its source and that is coupled to the gate of the first FET at its gate;
   a first switch that is coupled to the node between the gates of the first and the second FETs and that is coupled to the node between the sources of the first and second FETs, wherein the first switch is actuated by an inverse of a control signal;
   a second switch that is coupled to the drain of the second FET and coupled to the bandgap reference circuit;
   a third switch that is coupled to the drain of the first FET;
   a fourth switch that is coupled to the third switch, wherein the fourth switch is actuated by the inverse of the control signal;
   a fifth switch that is coupled to the node between the third and fourth switches, that is coupled to the node between the second switch and the bandgap reference circuit, and that is coupled to the node between the first and second current sources, wherein the fifth switch is actuated by the control signal;
   a third FET that is diode-connected and that is coupled to the fifth switch at its drain; and
   a fourth FET that is coupled to the source of the third FET at its source and that is coupled to the gate of the third FET at its gate;
   a sixth switch that is coupled to the nodes between the gates of the third and the fourth FETs and that is coupled to the node between the sources of the third and fourth FETs, wherein the sixth switch is actuated by the control signal;
   a fifth FET that is coupled to the sources of the third and fourth FETs at its source and that is coupled to the gates of the third and fourth FETs at its gate;
   a third current source that is coupled to the drain of the fifth FET;
   a sixth FET that is coupled to the node between the third current source and the fifth FET at its gate; and
   a fourth current source that is coupled between the drain of the sixth FET and the sources of the third and fourth FETs.

10. The apparatus of claim 9, wherein the bandgap reference circuit further comprises:
    a reference network that is coupled to the second switch; and
    an amplifier having a plurality of input terminals and an output terminal, wherein the input terminals of the amplifier and the output terminal are coupled to the reference network.

11. The apparatus of claim 10, wherein the reference network further comprises a plurality of branches that are each coupled to the output terminal and at least one input terminal.

12. An apparatus comprising:
    a bandgap reference circuit that outputs a reference voltage;
    a bias generator having:
       a first current source;
       a second current source coupled to the first current source;
       a first FET that is diode-connected; and
       a second FET that is coupled to the source of the first FET at its source and that is coupled to the gate of the first FET at its gate;
    a first switch that is coupled to the node between the gates of the first and the second FETs and that is coupled to the node between the sources of the first and second FETs, wherein the first switch is actuated by an inverse of a control signal;
    a second switch that is coupled to the drain of the second FET and coupled to the bandgap reference circuit;
    a third switch that is coupled to the drain of the first FET;
    a fourth switch that is coupled to the node between the first and the second current sources and that is coupled to the third switch, wherein the fourth switch is actuated by the inverse of the control signal;
    a fifth switch that is coupled to the node between the first and the second current sources and the bandgap reference circuit, wherein the fifth switch is actuated by the control signal;
    a third FET that is coupled to the fifth switch at its drain; and
    a fourth FET that is coupled to the source of the third FET at its source and that is coupled to the gate of the third FET at its gate;
    a sixth switch that is coupled to the nodes between the gates of the third and the fourth FETs and that is coupled to the node between the sources of the third and fourth FETs, wherein the sixth switch is actuated by the control signal;
    a fifth FET that is coupled to the sources of the third and fourth FETs at its source and that is coupled to the gates of the third and fourth FETs at its gate;
    a third current source that is coupled to the drain of the fifth FET;
    a sixth FET that is coupled to the node between the third current source and the fifth FET at its gate; and
    a fourth current source that is coupled between the drain of the sixth FET and the sources of the third and fourth FETs.

13. The apparatus of claim 12, wherein the bias generator further comprises an amplifier having a first input terminal, a second input terminal, and an output terminal, wherein the first input terminal is coupled to the drain of the third FET, the second input terminal is coupled drain of the fourth FET, and the output terminal is coupled to the node between the gates of the third and fourth FETs.

14. The apparatus of claim 12, wherein the bandgap circuit further comprises:
   a reference network that is coupled to the second switch; and
   an amplifier having a plurality of input terminals and an output terminal, wherein the input terminals of the amplifier and the output terminal are coupled to the reference network.

15. The apparatus of claim 14, wherein the reference network further comprises a plurality of branches that are each coupled to the output terminal and at least one input terminal.

* * * * *